(12) United States Patent
Miyazawa et al.

(10) Patent No.: US 7,657,743 B2
(45) Date of Patent: *Feb. 2, 2010

(54) INFORMATION VIEWING/LISTENING SYSTEM

(75) Inventors: Yasunaga Miyazawa, Okaya (JP);
Mitsuhiro Inazumi, Shiojiri (JP);
Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1159 days.

This patent is subject to a terminal disclaimer.

(21) Appl. No.: 10/751,991

(22) Filed: Jan. 7, 2004

(65) Prior Publication Data

US 2004/0194125 A1   Sep. 30, 2004

(30) Foreign Application Priority Data

Jan. 29, 2003   (JP)   ............................. 2003-020431

(51) Int. Cl.
*H04L 9/32* (2006.01)
(52) U.S. Cl. ........................... 713/168; 725/25; 725/30; 725/31; 713/169; 713/170; 726/21
(58) Field of Classification Search ................. 380/211, 380/247, 248; 725/30, 31, 133, 141, 153, 725/25

See application file for complete search history.

(56) References Cited

U.S. PATENT DOCUMENTS

| | | | | |
|---|---|---|---|---|
| 4,800,590 | A * | 1/1989 | Vaughan ...................... | 713/184 |
| 5,784,464 | A | 7/1998 | Akiyama et al. | |
| 6,774,926 | B1 * | 8/2004 | Ellis et al. ................. | 348/14.01 |
| 6,804,507 | B2 * | 10/2004 | Ishikawa et al. .......... | 455/412.1 |
| 6,957,339 | B2 * | 10/2005 | Shinzaki ...................... | 713/186 |
| 6,961,858 | B2 * | 11/2005 | Fransdonk ................... | 726/29 |
| 6,986,047 | B2 | 1/2006 | Giles et al. | |
| 7,458,101 | B2 * | 11/2008 | Miyazawa et al. ........... | 726/29 |
| 2001/0037388 | A1 * | 11/2001 | Suzuki ....................... | 709/225 |
| 2002/0152091 | A1 * | 10/2002 | Nagaoka et al. ............... | 705/1 |
| 2002/0194140 | A1 * | 12/2002 | Makuck ....................... | 705/67 |
| 2006/0070121 | A1 * | 3/2006 | Itabashi ........................ | 726/9 |

FOREIGN PATENT DOCUMENTS

| | | |
|---|---|---|
| JP | A-08-305662 | 11/1996 |
| JP | A-09-006608 | 1/1997 |
| JP | A-2000-029841 | 1/2000 |
| JP | A-2000-181963 | 6/2000 |

(Continued)

*Primary Examiner*—Brian T Pendleton
*Assistant Examiner*—Nnenna N Ekpo
(74) *Attorney, Agent, or Firm*—Oliff & Berridge, PLC

(57) ABSTRACT

To enable use of content data recorded in an arbitrary player using a mobile terminal, such as a cellular phone, in response to an inquiry made by a mobile terminal to a player, the player transmits a response to the mobile terminal. When a user performs a predetermined operation on the mobile terminal, the mobile terminal creates a one-time password and transmits the one-time password and operation information concerning the user-performed operation to the player. The player transmits a terminal ID and the like to a service center. Upon reception of the information, the service center creates a one-time password and transmits the one-time password and an operation permission command to the player. The player compares the transmitted password with the password created by the mobile terminal. When the passwords are verified, the user operation instruction is made valid.

20 Claims, 7 Drawing Sheets

FOREIGN PATENT DOCUMENTS

| | | |
|---|---|---|
| JP | A-2001-067320 | 3/2001 |
| JP | A 2001-067795 | 3/2001 |
| JP | A-2001-175599 | 6/2001 |
| JP | A-2001-282736 | 10/2001 |
| JP | A-2002-259344 | 9/2002 |
| JP | A-2002-288449 | 10/2002 |
| WO | WO 02/093377 | 11/2002 |

* cited by examiner

INFORMATION VIEWING/LISTENING SYSTEM

BACKGROUND OF THE INVENTION

1. Field of Invention

The present invention relates to an information viewing/listening system in which various types of information, such as music and movies, can be obtained via a network and viewed/listened to.

2. Description of Related Art

Services that enable a user to obtain information, such as music, movies, and games (referred to as content data) from a service center or the like via the Internet (hereinafter referred to as content data services) have become widely used.

A general content data service lets the user download content data stored at an information provider side (referred to as a service center) via the Internet, record the content data in a player having a function of at least playing content data (including not only a music player and a video player, but also a personal computer), and play the recorded content data. In such a content data service, a fee charged for using content data is generally paid by a credit card or the like via a network.

Since data handled in this type of content data service is digital data, the data can be copied almost without degradation. As such, the data may be transmitted without authorization and recorded into a unit owned by a user who has not paid a usage fee (unauthorized copying).

To address this problem, for example, a method is described in Japanese Unexamined Patent Application Publication No. 2001-67795.

This related art causes a plurality of information receivers having different pieces of registration information for using content data to exchange the registration information, thereby enabling the information receivers to mutually determine whether they are authorized to use the content data. Of the plural information receivers, a first information receiver that has the right to use the content data transfers this usage right to a second information receiver determined by the first information receiver as authorized to use the content data, thereby enabling the second information receiver having received the usage right to use the content data. Accordingly, content data received by the first information receiver is transmitted to the second information receiver, and the transmitted content data is recorded (copied) in the second information receiver.

This related art requires an information receiver to which content data is copied to exchange beforehand information with a service center or the like and to register registration information for using the content data. Even when the above-described second information receiver has a function of playing the content data (including a function of decrypting the content data since this type of content data is generally encrypted), if the second information receiver has no registration information, the data in the first information receiver cannot be copied to the second information receiver.

It is impossible for a unit having received content data (first information receiver in the example of the related art described above) to transmit this content data that has been copied to another unit (second information receiver in the example of the related art described above), and then the second information receiver makes a contract with a service center or the like and obtains registration information. Even an authorized copy to be made afterwards is restricted.

Since this related art imposes no restrictions on a decryption method for playing content data (in this case, decryption includes both decoding encoded content data and decrypting encrypted content data), when content data recorded in a memory (RAM or HDD, for example) of a particular information receiver is read in one way or another, the read content data itself can be copied without authorization to another unit, and the copied content data can be played on the unit having the unauthorized copy.

To decrypt encrypted content data, there is a related art method using a content key for decryption, which is received via a network. Since this content key is included in encrypted data, the encrypted data is rarely copied without authorization. However when the encrypted data is read in one way or another, the content data is decrypted without authorization.

To prevent unauthorized decryption, the content key is periodically updated. Every time the content key is updated, the encrypted content data must be re-received.

To enhance security, the content key must be updated very frequently. When the content key is updated very frequently, the encrypted data must be re-received many times. In this case, when the content data is large, as in a movie, an information receiver at the user side must perform a great amount of arithmetic processing every time it receives the content data. Since the transmitted data is large, the network load is high.

Practically, therefore the content key cannot be updated very frequently. The same content key must be used for a certain period of time. When a period of time before the content key is updated is excessively long, the content key and the content data may be copied to another unit without authorization.

As described above, a known content data service system including the above-described related art carries out various measures to prevent unauthorized copy of content data and to charge a legitimate fee, when viewed from the service center side. However, when viewed from the user side, user-friendliness is unsatisfactory, and there is much room for improvement.

SUMMARY OF THE INVENTION

Accordingly, the present invention provides a user-friendly information viewing/listening system that reliably reduces or prevents unauthorized use of content data and that enables use of content data recorded in an arbitrary information player using a mobile terminal, such as a cellular phone or the like.

To achieve the above-described object, an information viewing/listening system of an aspect of the present invention includes an information provider that stores content data to be provided to a user, at least one information player that establishes a connection to the information provider via a network and at least plays information, and at least one mobile terminal that operates said at least one information player in response to a predetermined operation performed on the mobile terminal. A process performed when using content data recorded in the information player using the mobile terminal includes the steps of: in response to a predetermined operation performed by the user on the mobile terminal, creating, by the mobile terminal, a password using preset information and transmitting, by the mobile terminal, at least the password and operation information concerning an operation performed by the user on the mobile terminal for using the content data, to the information player; upon reception by the information player of the information transmitted from the mobile terminal, transmitting, by the information player, terminal-unique information given to the mobile terminal, player-unique information given to the information player, and the operation information concerning the user-performed operation for using the content data to the information provider; upon reception by the information provider of the information transmitted from the information player, creating, by the information provider, a password using preset information and transmitting, by the information provider, at least the password to the information player; and comparing, by the information player, the password transmitted from the information provider with the password transmitted from the mobile terminal and when, as a result of comparison, the passwords are verified, executing, by the information player, the user-performed operation for using the content data.

In an aspect of the information viewing/listening system, the passwords are passwords that are valid only for a limited period of time.

In an aspect of the information viewing/listening system, necessary information to create each of the passwords essentially includes the terminal-unique information given to the mobile terminal and current time information. In addition to the terminal-unique information and the current time information, the necessary information includes at least one of the player-unique information, the operation information concerning the user-performed operation for using the content data, and user-unique information given to the user.

In an aspect of the information viewing/listening system, when the content data recorded in the information player is used using the mobile terminal, the mobile terminal on which the operation for using the content data is performed is charged a fee, when viewed from the information provider side.

In an aspect of the information viewing/listening system, the creation of the password by the mobile terminal and, in response thereto, the creation of the password by the information provider is performed when a playback operation to playback the content data recorded in the information player is made, the playback being one of operations performed by the user relative to the information player for using the content data.

In an aspect of the information viewing/listening system, the creation of the password by the mobile terminal and, in response thereto, the creation of the password by the information provider, are preferably performed when any of operation requests for a plurality of predetermined types of operations is made, the operations being among operations performed by the user relative to the information player for using the content data.

In an aspect of the information viewing/listening system, when the information player obtains content data from the information provider or another information player, the information player is permitted to obtain the content data without creating the password.

In an aspect of the information viewing/listening system, the mobile terminal includes at least a unit operation section to input information and specifying operations; a data transmitter-receiver that performs communication between the information player and the information provider; a password creating unit that creates the password; a time keeping unit that outputs current time information; and a unit-unique-information recording unit that records the terminal-unique information given to the mobile terminal.

The information player includes a content-data recording unit that records content data obtained from the information provider or another information unit; a unit-unique-information recording unit that records the player-unique information given to the information player; a playback-signal output unit that outputs the content data recorded in the content-data recording unit as a playback signal; a control command unit that compares, as a control command process, the password created by the mobile terminal with the password created by the information provider, judges the validity of the passwords, and, when the validity is verified, makes the user-performed operation for using the content data valid; and a data transmitter-receiver that exchanges a signal with the information provider via the network and that exchanges a signal with the mobile terminal.

In an aspect of the information viewing/listening system, the information provider includes a data transmitter-receiver that exchanges a signal with the information player and the mobile terminal via the network; a content-data recording unit that stores the content data; a unit-unique-information recording unit that records unit-unique information concerning each information player registered with the information provider by a predetermined process and each mobile terminal registered with the information provider by a predetermined process; a user-information recording unit that records, as user information, information concerning the user who owns each registered mobile terminal; a unit-information recording unit that records, as unit information, information concerning each information player, the information including a function of each registered information player; a time-information output unit that outputs current time information; and a password creating unit that creates the password.

According to another aspect of the present invention, an information viewing/listening system includes an information provider that stores content data to be provided to a user, at least one information player that establishes a connection to the information provider via a network and at least plays information, and at least one mobile terminal that operates said at least one information player in response to a predetermined operation performed on the mobile terminal. A process performed when using content data recorded in the information player using the mobile terminal includes the steps of, in response to a predetermined operation performed by the user on the mobile terminal, transmitting, by the mobile terminal, at least operation information concerning an operation performed by the user on the mobile terminal for using the content data to the information player; upon reception by the information player of the information transmitted from the mobile terminal, creating, by the information player, a password using preset information and transmitting, by the information player, terminal-unique information given to the mobile terminal, player-unique information given to the information player, and the operation information concerning the user-performed operation for using the content data to the information provider; upon reception by the information provider of the information transmitted from the information player, creating, by the information provider, a password using preset information and transmitting, by the information provider, at least the password to the information player; and comparing, by the information player, the password transmitted from the information provider with the password created by the information player and when, as a result of comparison, the passwords are verified, executing, by the information player, the user-performed operation for using the content data.

In the information viewing/listening system according to an aspect of the present invention, the passwords are passwords that are valid only for a limited period of time.

In the information viewing/listening system according to an aspect of the present invention, necessary information to create each of the passwords essentially includes the terminal-unique information given to the mobile terminal and current time information; and, in addition to the terminal-unique information and the current time information, the necessary information includes at least one of the player-unique information, the operation information concerning the user-performed operation for using the content data, and user-unique information given to the user.

In the information viewing/listening system according to an aspect of the present invention, when the content data recorded in the information player is used using the mobile terminal, the mobile terminal on which the operation for using the content data is performed is charged a fee, when viewed from the information provider side.

In the information viewing/listening system according to an aspect of the present invention, the creation of the password by the information player and, in response thereto, the creation of the password by the information provider, are performed when a playback operation to playback the content data recorded in the information player is made, the playback being one of operations performed by the user relative to the information player for using the content data.

In the information viewing/listening system according to an aspect of the present invention, the creation of the password by the information player and, in response thereto, the creation of the password by the information provider, are preferably performed when any of operation requests for a plurality of predetermined types of operations is made, the operations being among operations performed by the user relative to the information player for using the content data.

In the information viewing/listening system according to an aspect of the present invention, when the information player obtains content data from the information provider or another information player, the information player is permitted to obtain the content data without creating the password.

In the information viewing/listening system according to an aspect of the present invention, the mobile terminal includes at least a unit operation section for inputting information and specifying operations; a data transmitter-receiver that performs communication between the information player and the information provider; and a unit-unique-information recording unit that records the terminal-unique information given to the mobile terminal.

In the information viewing/listening system according to an aspect of the present invention, the information player includes a content-data recording unit that records content data obtained from the information provider or another information unit; a unit-unique-information recording unit that records the player-unique information given to the information player; a playback-signal output unit that outputs the content data recorded in the content-data recording unit as a playback signal; a password creating unit that creates the password; a control command unit that compares, as a control command process, the password created by the password creating unit with the password created by the information provider, judges the validity of the passwords, and, when the validity is verified, makes the user-performed operation for using the content data valid; and a data transmitter-receiver that exchanges a signal with the information provider via the network and that exchanges a signal with the mobile terminal.

In the information viewing/listening system according to an aspect of the present invention, the information provider includes a data transmitter-receiver that exchanges a signal with the information player and the mobile terminal via the network; a content-data recording unit that stores the content data; a unit-unique-information recording unit that records unit-unique information concerning each information player registered with the information provider by a predetermined process and each mobile terminal registered with the information provider by a predetermined process; a user-information recording unit that records, as user information, information concerning the user who owns each registered mobile terminal; a unit-information recording unit that records, as unit information, information concerning each information player, the information including a function of each registered information player; a time-information output unit that outputs current time information; and a password creating unit that creates the password with information from one of mobile terminals which are registered.

According to an aspect of the present invention, content data recorded in an information player (hereinafter referred to as a player) can be played by performing an operation on a portable mobile terminal (hereinafter referred to as a mobile terminal), such as a cellular phone. The content data recorded in the player may include that obtained from an information provider and that copied from another player. According to an aspect of the present invention, no particular restrictions are imposed on the manner of obtaining content data to be played. A restriction is imposed on the act of using content data imported into the player.

Accordingly, for example, a user who owns a mobile terminal can use content data stored in a player owned by another user using the mobile terminal. Specifically, given a player registered with the information provider and a mobile terminal registered with the information provider, the user who owns this mobile terminal can use the player in which content data available for use is recorded even when the player is not owned by this user. A fee for using the content data is charged to the user who has used the content data (the owner of the mobile terminal on which an operation for using the content data is performed).

According to an aspect of the present invention, a password serving as a key for using (such as playing) content data on the player is a one-time password based on the current time. Unlike the case of the described related art, this reduces or prevents unauthorized use of content data due to using a content key for a predetermined period of time. Since the one-time password can be created using a not-so-complex algorithm, the one-time password is created without a heavy load on an arithmetic processing unit.

The creation of the password by the player and, in response thereto, the creation of the password by the information provider are performed at least when a playback operation request for playback of the content data recorded in the player is made. In other words, passwords are created every time the user views/listens to content data. This reduces or prevents unauthorized use of content data, such as use of content data without paying a usage fee.

The creation of the password by the player and, in response thereto, the creation of the password by the information provider are performed when any of operation requests for a plurality of predetermined types of operations is made. Accordingly, operation restrictions can be imposed on various manners of using content data. This reduces or prevents unauthorized use, which is use of content data without paying a usage fee, or unprescribed use of content data.

When the player obtains content data from the information provider or another player, the player is permitted to obtain the content data without creating the password. When a unit (first player) tries to copy content data obtained from the information provider to another unit (second player) with a function of playing the content data, as in the first player, the content data in the first player is copied to the second player, and, subsequently, the second player is registered with the information provider, thereby enabling playback of the content data after the registration. Such usage enhances user-friendliness.

Necessary information to create each of the passwords essentially includes the terminal-unique information given to the mobile terminal and current time information. In addition to the terminal-unique information and the current time information, the necessary information includes at least one of the player-unique information, the operation information concerning the user-performed operation for using the content, and user-unique information concerning the user (user ID).

Since each of the passwords is created using various types of information, the secrecy of the password becomes high. Accordingly, unauthorized use of content data is reduced or prevented in a more secure manner.

By transmitting the operation information concerning the user-performed operation for using the content to the information provider side, the operation performed by the user can be detected at the information provider side. When viewed from the information provider side, a fee can be charged for every operation performed by the user. Accordingly, legitimate and detailed fee charging based on the details of an operation performed by the user can be performed.

The mobile terminal for use in the information viewing/listening system of an aspect of the present invention may include a personal mobile terminal, such as a cellular phone, widely used at present. When provided with a simple function, such as a password creating unit, this personal mobile terminal may serve as the mobile terminal. Needless to say, a mobile terminal dedicated for use in the information viewing/listening system of an aspect of the present invention may be manufactured.

The player for use in the information viewing/listening system of an aspect of the present invention includes a content-data recording unit that records content data obtained from the information provider or another information unit; a unit-unique-information recording unit that records the player-unique information given to the information player; a playback-signal output unit that outputs the content data recorded in the content-data recording unit as a playback signal; a control command unit that compares, as a control command process, the password created by the mobile terminal with the password created by the information provider, judges the validity of the passwords, and, when the validity is verified, makes the user-performed operation for using the content data valid; and a data transmitter-receiver that exchanges a signal with the information provider via the network and that exchanges a signal with the mobile terminal. Accordingly, the player need not be provided with a password creating function, and the amount of calculation is reduced.

The information provider for use in the information viewing/listening system of an aspect of the present invention includes a data transmitter-receiver that exchanges a signal with the information player and the mobile terminal via the network; a content-data recording unit that stores the content data; a unit-unique-information recording unit that records unit-unique information concerning each information player registered with the information provider by a predetermined process and each mobile terminal registered with the information provider by a predetermined process; a user-information recording unit that records, as user information, information concerning the user who owns each registered mobile terminal; a unit-information recording unit that records, as unit information, information concerning each information player, the information including a function of each registered information player; a time-information output unit that outputs current time information; and a password creating unit that creates the password.

As described above, the information provider of an aspect of the present invention creates a password on the basis of information transmitted from the player and transmits the password to the player. The player compares the password transmitted from the information provider with the password transmitted from the mobile terminal and determines whether the two passwords match each other. Only when the validity of the passwords is verified, a user-requested operation is executed. That is, the information provider of an aspect of the present invention only creates a password on the basis of information transmitted from the player, and hence unauthorized use of content data by a unit that has not been registered with the information provider is reduced or prevented. Since this password is a one-time password based on the current time, unlike the case of the related art, unauthorized use of content data, due to using a content key for a predetermined period of time, is reduced or prevented. Since the one-time password can be created using a not-so-complex algorithm, the one-time password is created by a relatively simple calculation.

According to an aspect of the present invention, the mobile terminal is provided with a password creating function. Alternatively, the mobile terminal may not be provided with a password creating function, and, instead, the player may be provided with a password creating function. This serves as another aspect of the present invention. According to this other aspect of the present invention, the mobile terminal need not be provided with a password creating function. Accordingly, no great modifications need be done to the current cellular phones or the like, and the mobile terminal becomes less expensive.

DETAILED DESCRIPTION OF PREFERRED EMBODIMENTS

First Exemplary Embodiment

Figure 1:
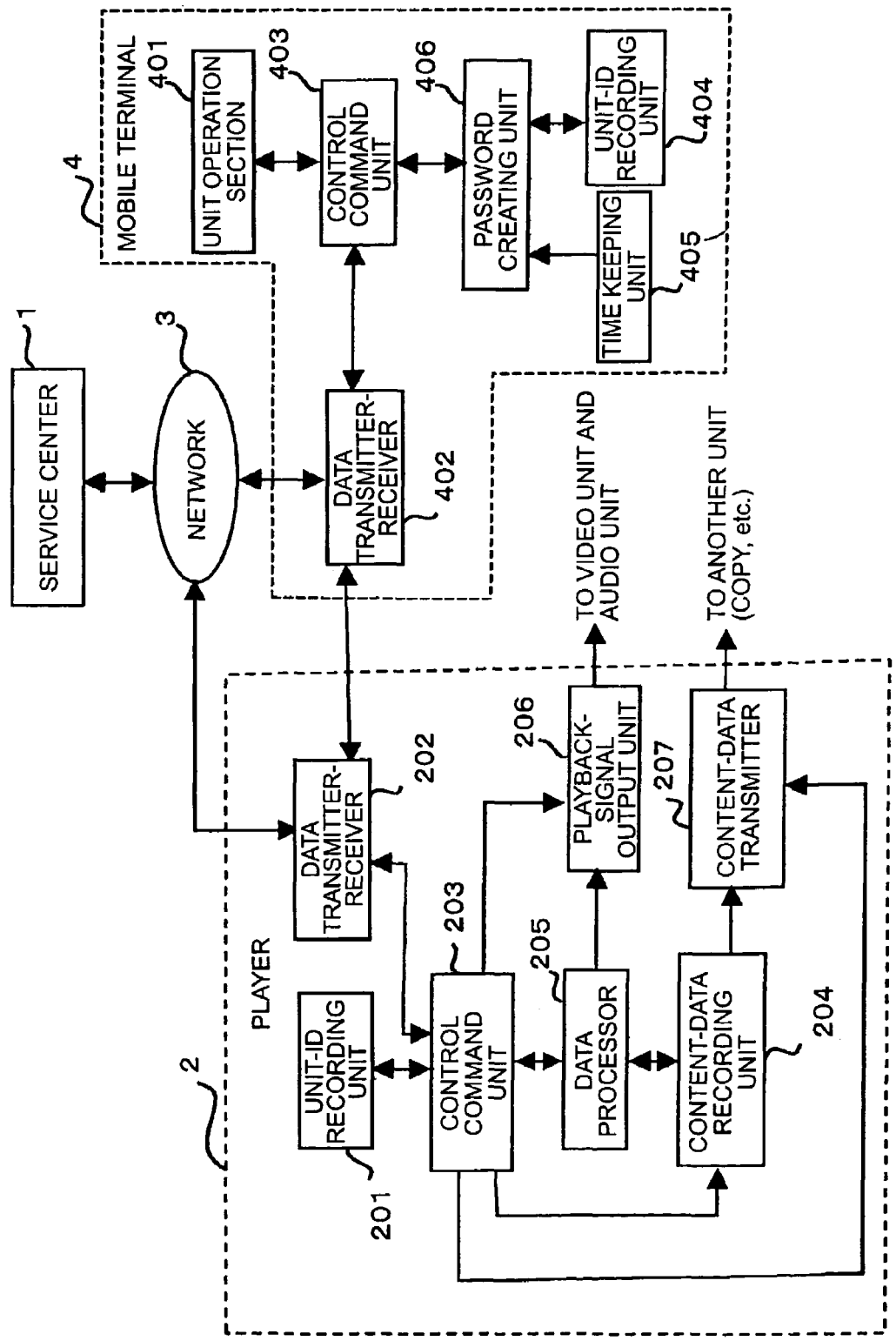
FIG. 1 illustrates a first exemplary embodiment of an information viewing/listening system of the present invention, which is a block diagram mainly showing the configuration of a player and a mobile terminal.

FIG. 1 shows the configuration of an information viewing/listening system according to a first exemplary embodiment of the present invention. This information viewing/listening system is largely divided into a service center 1 serving as an information provider storing content data to be provided to a user, an information player (referred to as a player) 2 that can establish a connection to the service center 1 via a network 3 and that has at least a function of playing information, and a portable mobile terminal (referred to as a mobile terminal) 4 capable of operating the player 2.

FIG. 1 is a schematic mainly showing the configuration of the player 2 and the mobile terminal 4. The configuration of the service center 1 is described later. Although FIG. 1 only shows one service center 1, one player 2, and one mobile terminal 4, the player 2 and the mobile terminal 4 being connected with each other via the network 3, the actual information viewing/listening system generally includes a plurality of these components.

The player 2 has a function of obtaining content data from the service center 1 or another player 2 not shown in the figure, recording the content data, and outputting the content data as a signal that can be played by a video unit or an audio unit. The player 2 is not limited to a particular unit and includes any unit with such a function. For example, the player 2 may be a player dedicated to playing music or video, a personal computer, a television, a radio receiver, a vehicle-mounted unit, a game machine, and an electronic book viewer.

In FIG. 1, the player 2 is provided with no video unit and no audio unit. Alternatively, the player 2 may be provided with a video unit and an audio unit. FIG. 1 shows only necessary components of the player 2 for describing an aspect of the present invention.

A simple description of the configuration of the player 2 will now be given. The player 2 includes a unit-ID recording unit 201 that records player-unique information given to the player 2 (referred to as a player ID); a data transmitter-receiver 202 that serves as an interface with the service center 1 and the mobile terminal 4, that communicates with the service center 1 via the Internet or the like, and that communicates with the mobile terminal 4 via Bluetooth or the like; a control command unit 203 that gives a control command to each component included in the player 2; a content-data recording unit 204 that records content data obtained from the service center 1 or another player in one way or another; a data processor 205 that performs various types of data processing as a player; a playback-signal output unit 206 that outputs the data processed by the data processor 205 as a playback signal to a video unit and/or an audio unit; and a content-data transmitter 207 to transmit the content data recorded in the content-data recording unit 204 to another player.

Although the mobile terminal 4 may be a cellular phone, the mobile terminal 4 includes, in addition to the functions of a general cellular phone, necessary functions to serve as the mobile terminal 4 of an aspect of the present invention. FIG. 1 shows only necessary components of the mobile terminal 4 for describing an aspect of the present invention.

If the mobile terminal 4 is a cellular phone, the mobile terminal 4 includes a unit operation section 401 including a numeric keypad and a jog dial; a data transmitter-receiver 402 that has a general communication function of a cellular phone and that communicates with the service center 1 via the network 3 and with the player 2 via a communication standard, such as Bluetooth, as described above; a control command unit 403 that outputs various control commands to perform necessary operations of an aspect of the present invention; a unit-ID recording unit 404 that records a terminal-unique information given to the mobile terminal 4 (referred to as a terminal ID); a time keeping unit 405 that outputs the current time; and a password creating unit 406 that creates a password that is valid only at a particular time (which may tolerate some deviations) (hereinafter referred to as a one-time password) on the basis of current time information generated by the time keeping unit 405, the terminal ID recorded in the unit-ID recording unit 404, the player ID obtained from the player 2, and the like. Although necessary information to create the one-time password includes the terminal ID, the player ID, and the current time information in this case, the necessary information may include only the terminal ID and the current time information or may include other types of information. This will be described later.

Figure 2:
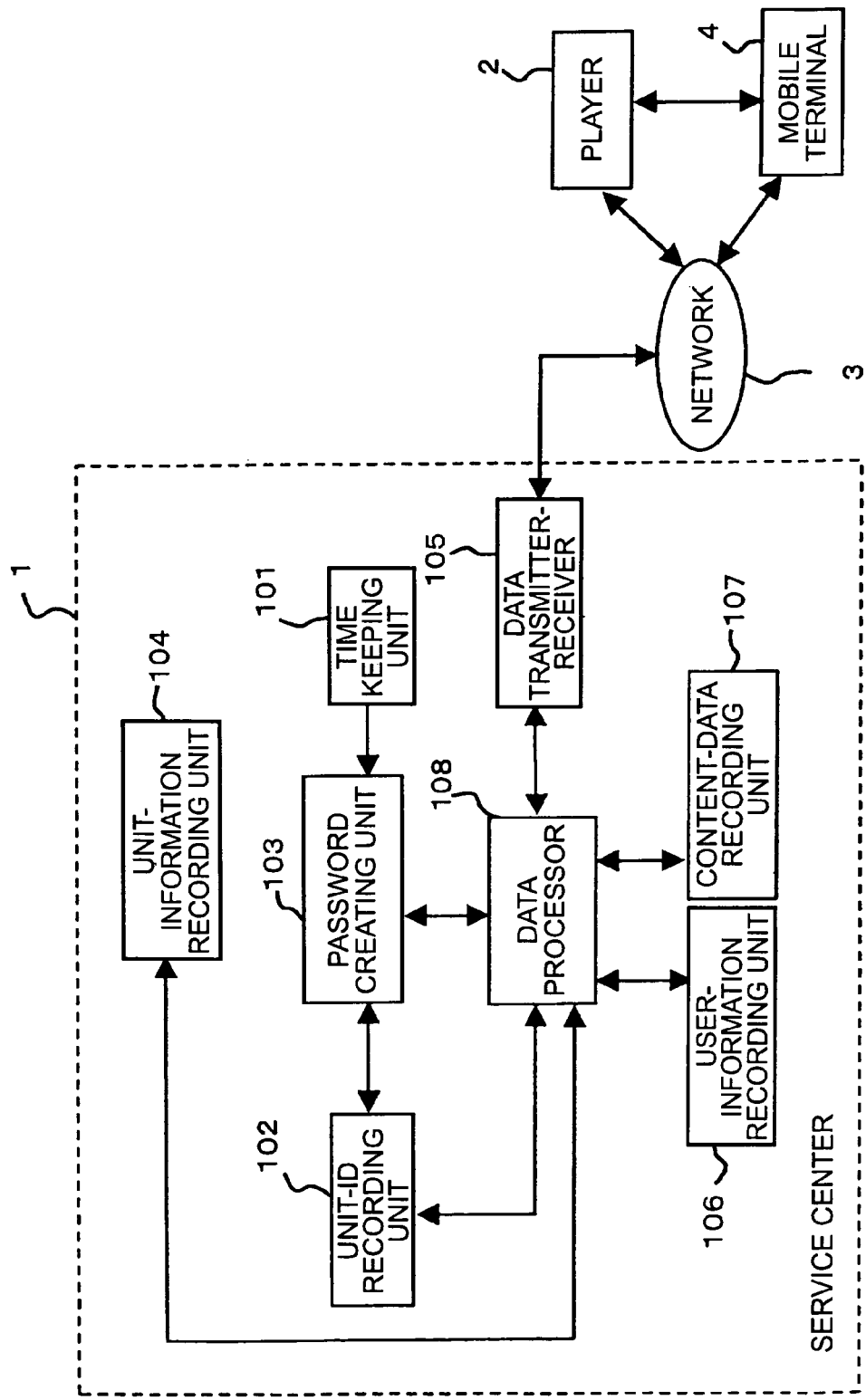
FIG. 2 is a block schematic mainly showing the configuration of an information provider (service center) in the information viewing/listening system shown in FIG. 1.

FIG. 2 illustrates the configuration of the service center 1. FIG. 2 shows only necessary components of the service center 1 for describing an aspect of the present invention.

The service center 1 includes a time keeping unit 101 that outputs current time information; a unit-ID recording unit 102 that records the unit IDs of the player 2 and the mobile terminal 4 registered with the service center 1 (the player ID and the terminal ID); a password creating unit 103 that creates a password that is valid only at a particular time (which may tolerate some deviations) (one-time password) on the basis of the same information used by the mobile terminal 4 to create the password and the current time information obtained from the time keeping unit 101 of the service center 1; a unit-information recording unit 104 that records information indicating a function(s) of each player 2 registered with the service center 1 (unit information) according to each player 2; a data transmitter-receiver 105 that serves as an interface with the player 2 and the mobile terminal 4 and that exchanges information with each player 2 and each mobile terminal 4; a user-information recording unit 106 that records information on the user who uses each registered mobile terminal 4 (user ID individually given to each user and the details of a contract made by the user with the service center 1); a content-data recording unit 107 that records various types of content data that can be obtained by the player 2; and a data processor 108 that uses information obtained from these components to perform various types of processing as the service center 1.

Of the components of the player 2 and the mobile terminal 4 shown in FIG. 1 and the components of the service center 1 shown in FIG. 2, the password creating unit 406 of the mobile terminal 4, the password creating unit 103 of the service center 1, the unit-ID recording unit 201 of the player 2, the unit-ID recording unit 404 of the mobile terminal 4, the unit-ID recording unit 102 of the service center 1, the user information recording unit 106 of the service center 1, the data processor 205 of the player 2, and the data processor 108 of the service center 1, should be tamper-resistant hardware or software, and, as such, no alterations should be made in data or processes.

On a communication channel between the player 2 and the service center 1, communication using a security protocol, such as SSL (Secure Socket Layer), is performed since data transmission, such as transmission of the one-time password from the service center 1 to the player 2, requiring high security is performed. In compliance with such a security protocol, communication is performed between the mobile terminal 4 and the player 2.

Where necessary, the processing details and the operation of the components of the player 2 and the mobile terminal 4 shown in FIG. 1 and the components of the service center 1 shown in FIG. 2 will be described specifically in the operation described below.

Figure 3:
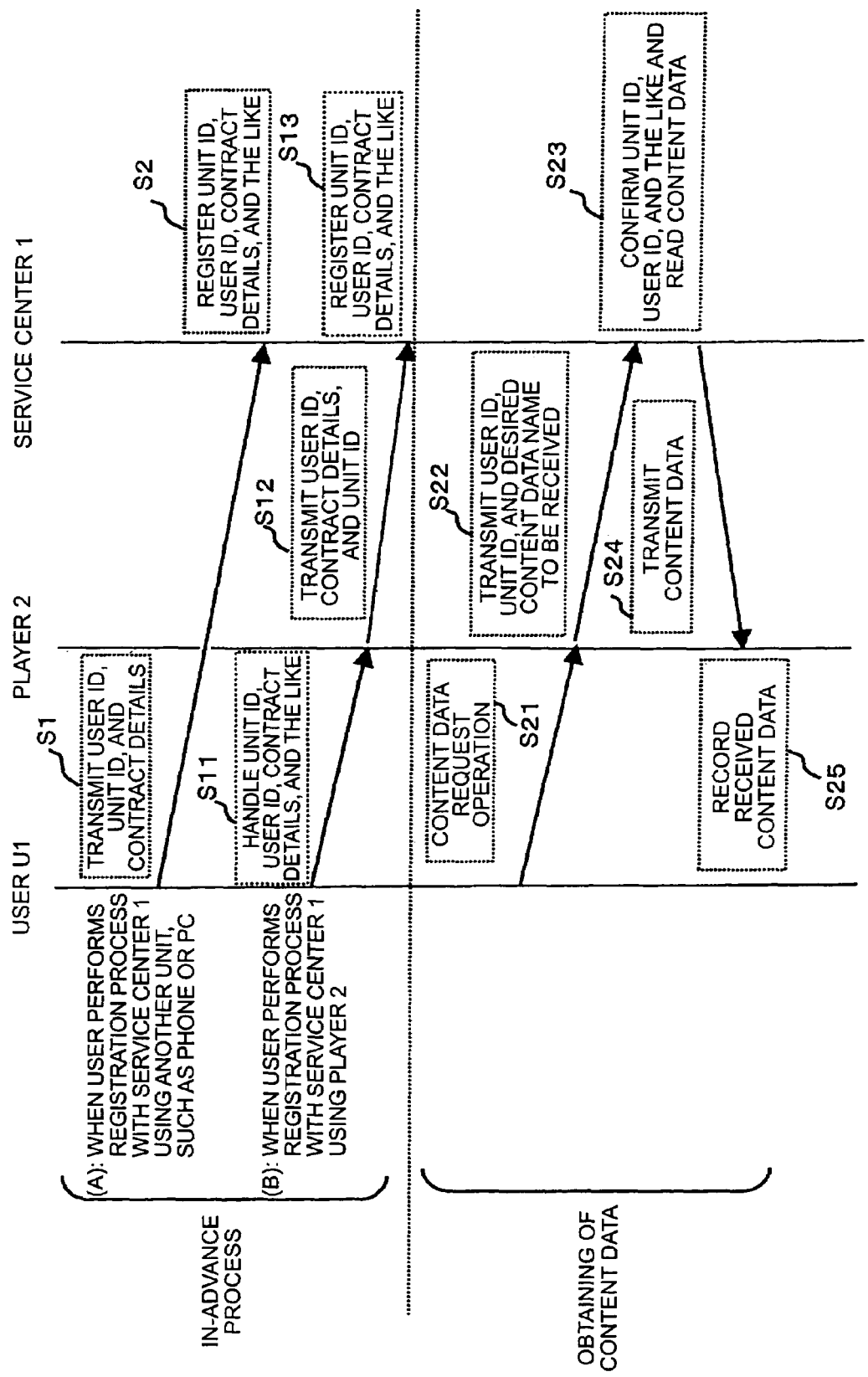
FIG. 3 illustrates the flow of processes performed by the information viewing/listening system of an aspect of the present invention, which include an in-advance process of registering the player with the information provider (service center) and a subsequent process of obtaining desired content data.
Figure 4:
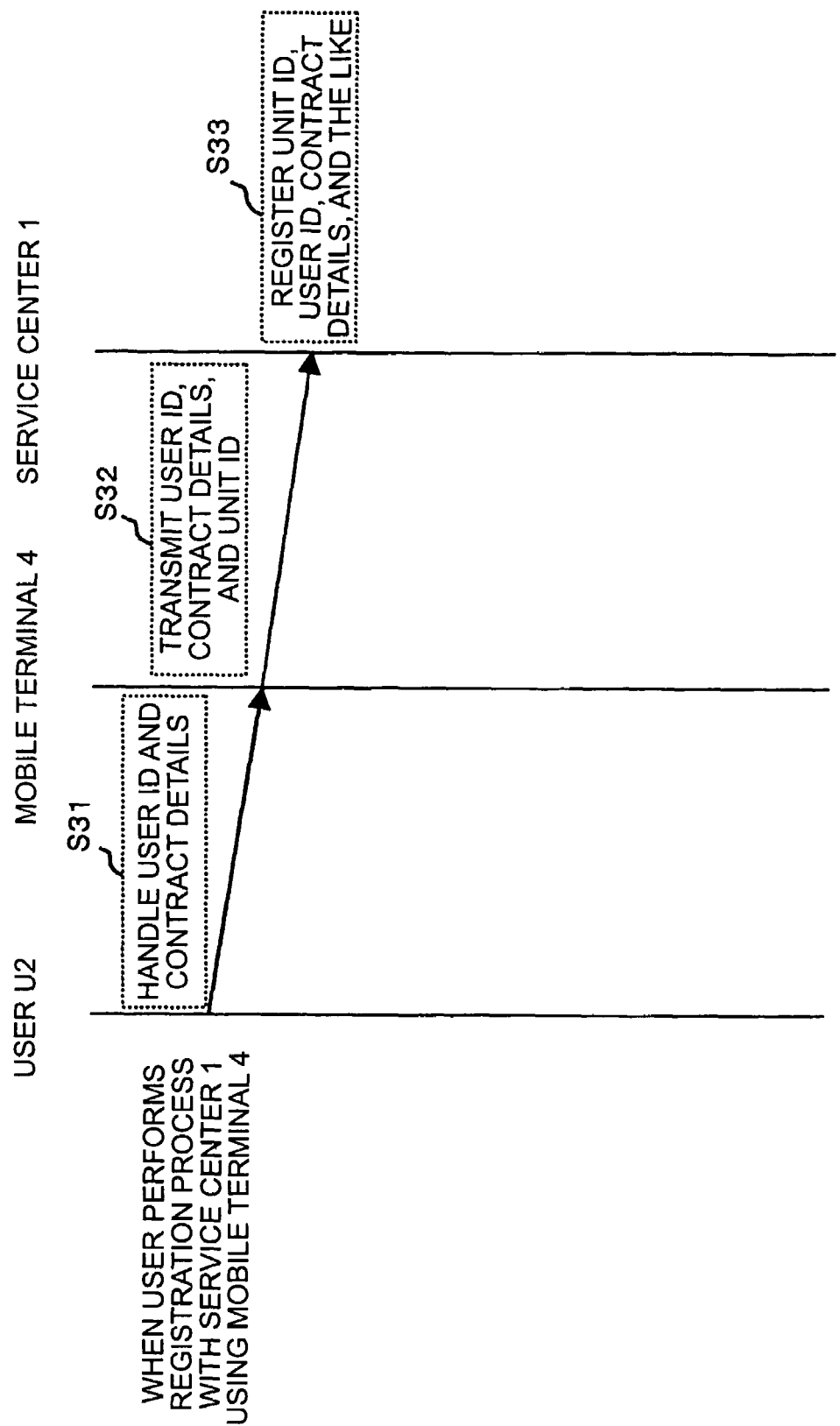
FIG. 4 illustrates the flow of a process performed by the information viewing/listening system of an aspect of the present invention, which is an in-advance process of registering the mobile terminal with the information provider (service center).
Figure 5:
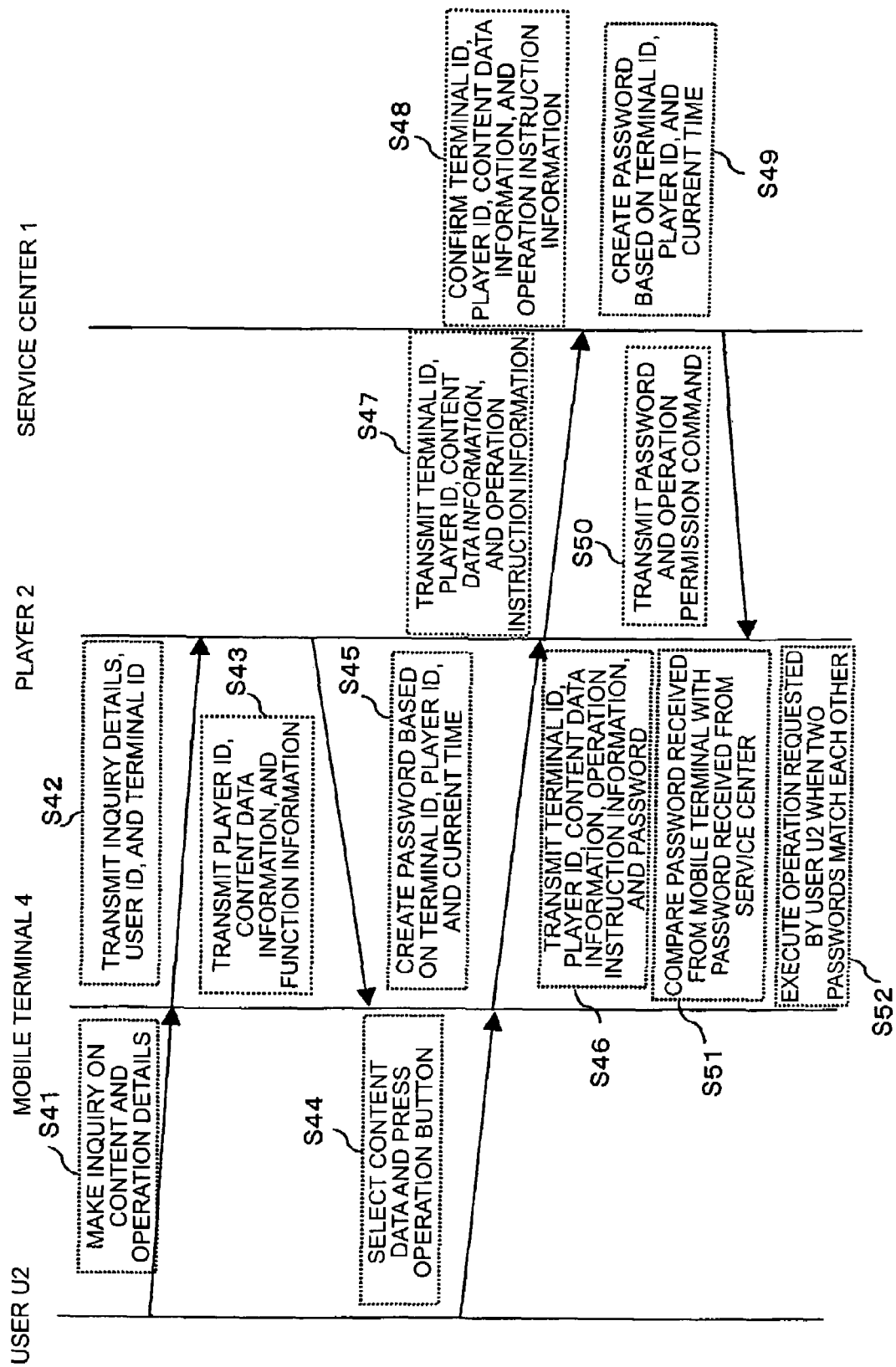
FIG. 5 illustrates the flow of a process performed by the information viewing/listening system of an aspect of the present invention, which is a process of playing content data recorded in the player using the mobile terminal.

FIGS. 3 to 5 illustrate the flow of processes according to an aspect of the present invention. FIG. 3 is a chart describing a so-called in-advance process of registering the player 2 with the service center 1 and, a process of obtaining, by the player 2, desired content data from the service center 1 after the in-advance process. FIG. 4 is a chart describing a so-called in-advance process of registering the mobile terminal 4 with the service center 1. FIG. 5 is a chart describing a process of playing content data recorded in the player 2 using the mobile terminal 4.

The in-advance process shown in FIG. 3, for registering the player 2 with the service center 1 is to register, with the service center 1, user-unique information (referred to as a user ID) given to a user who owns or manages the player 2 (referred to as a user U1), the player ID of the player 2, and the details of a contract including the type and scope of services (including the fee payment method and the like). Referring to FIG. 3, steps of the in-advance process will now be described.

The in-advance process includes two possible methods: a method, such as that shown in (A) of FIG. 3, in which the user U1 registers the player 2 with the service center 1 using a telephone or another unit (unit other than the player 2 to which the content data service is to be provided; when there is a personal computer other than the player 2 to which the content data service is to be provided, this personal computer is one possible unit); and a method, such as that shown in (B) of FIG. 3, in which the user U1 uses the player 2 to which the content data service is to be provided to register the player 2 with the service center 1.

In the case of (A), the user U1 notifies the service center 1 of the user ID of the user U1, the player ID (simply represented as the unit ID in FIG. 3) of the player 2 to which the content service is to be provided, and the details of a contract using a telephone or a personal computer (PC) (step S1).

In response to the notification from the user U1, the service center 1 confirms the user ID, the player ID, and the details of the contract, records the user ID and the details of the contract in the user-information recording unit 106, and records the player ID in the unit-ID recording unit 102 (step S2). At this time, the user ID, the details of the contract, and the player ID are recorded in association with one another.

In the case of (B), the user U1 uses the player 2 to which the content service is to be provided to input the user ID of the user U1 and the details of a contract (step S11). Accordingly, the player 2 transmits the user ID and the details of the contract, which are specified by the user U1, and the player ID of the player 2, which is stored in the unit-ID recording unit 201, to the service center 1 using the data transmitter-receiver 204 (step S12).

In response to the notification from the player 2, the service center 1 confirms the user if, the player ID, and the details of the contract, records the user ID and the details of the contract in the user-information recording unit 106, and records the player ID in the unit-ID recording unit 102 (step S 13). In this case, the user ID, the details of the contract, and the player ID are recorded in association with one another, as described above.

With the method of (A) or (B), the user ID) of the user U1, the player ID of the player 2 to which the service is to be provided, and the details of the contract for the service are registered with the service center 1. Accordingly, the in-advance process is completed.

When the in-advance process is completed in this manner, the user U1 can obtain a service provided by the service center 1. For example, to obtain content data, such as music, a movie, or a game, stored in the service center 1, similarly as shown in FIG. 3, the user U1 makes a request to obtain the content data using the player 2 owned by the user U1 (step S21). On the basis of the user operation, the control command unit 203 outputs the user ID, the player ID, and the desired content data name to be received (when the content data is a piece of music, the title or the specific number indicating this piece of music) to the data transmitter-receiver 202. The data transmitter-receiver 202 transmits these pieces of data to the service center 1 (step S22).

When the data transmitter-receiver 105 of the service center 1 receives data, such as the user ID, the player ID, and the content data name transmitted from the player 2, the data processor 108 confirms the received data, that is, determines whether the received pieces of data match the player ID recorded in the unit-ID recording unit 102 and the user ID recorded in the user-information recording unit 106. When these pieces of data are verified, the content data specified by the user U1 is read from the content-data recording unit 107 (step S23), and the content data (encrypted data) is transmitted to the player 2 (step S24).

When the data transmitter-receiver 202 of the player 2 receives the content data transmitted from the service center 1, the control command unit 203 stores the content data in the content-data recording unit 204 (step S25).

Referring to FIG. 4, the in-advance process of registering the mobile terminal 4 with the service center 1 will now be described. As in registration of the player 2 with the service center 1, registration of the mobile terminal 4 with the service center 1 may be performed by a method in which a user who owns the mobile terminal 4 (referred to as a user U2) uses a unit other the mobile terminal 4 (such as a personal computer or the like) to register the mobile terminal 4 with the service center 1 and a method in which the user U2 uses the mobile terminal 4, which is to be registered, to register the mobile terminal 4 with the service center 1. Hereinafter the method in which the mobile terminal 4 is registered with the service center 1 using the mobile terminal 4 will be described.

Using the unit operation section 401, the user U2 inputs user-unique information (user ID) given to the user U2 and the details of a contract including the type and scope of services (including the fee payment method and the like) to the mobile terminal 4 (S31). When the user U2 inputs these pieces of information, the mobile terminal 4 transmits the input user ID, the details of the contract, and the terminal ID recorded in the unit-ID recording unit 404 of the mobile terminal 4 (simply referred to as a unit ID in FIG. 3) to the service center I (step S32).

Upon reception of these pieces of information from the mobile terminal 4, the service center 1 records the terminal ID of the mobile terminal 4 in the unit-ID recording unit 102 and the user ID and the details of the contract in the user-information recording unit 106 (step S33).

Accordingly, registration of the mobile terminal 4 with the service center 1 is completed.

With reference to FIG. 5, a process of playing content data recorded in the content-data recording unit 204 of the player 2 using the mobile terminal 4 owned by the user U2 will now be described.

In this case, it is assumed that the player 2 is not owned by the user U2. The player 2 is a player owned by another user, and that a player installed in a public space, or a player installed in a particular business facility (such as an accommodation facility or an entertainment facility). It is assumed that the player 2 has at least the arrangement and functions shown in FIG. 1 and is registered with the service center 1 by the in-advance process illustrated in FIG. 3. It is also assumed that the mobile terminal 4 owned by the user U2 is registered with the service center 1 by the in-advance process illustrated in FIG. 4.

It is assumed that a plurality of pieces of content data has already been stored in the content-data recording unit 204 of the player 2. The content data may include that obtained from the service center 1 by the above-described process or that obtained from another player 2.

To use the content data, the user U2 performs an inquiry operation on the mobile terminal 4 to make an inquiry about the content data stored in the player 2 and the functions of the player 2 (functions including fast-forwarding and repeated playback) (step S41). The inquiry operation is performed by the unit operation section 401 of the mobile terminal 4. If the mobile terminal 4 is a cellular phone, the unit operation section 401 includes a numeric keypad and a jog dial. In such a case, the inquiry operation is performed using the numeric keypad and the jog dial.

When the user U2 performs the above-described operation on the mobile terminal 4, the mobile terminal 4 transmits, in addition to the details of the inquiry made by the user U2, the user ID of the user U2 (although the user ID may be input every time the user U2 performs such an operation, the user ID recorded in the mobile terminal 4 may be read) and the terminal ID of the mobile terminal 4, which is read from the unit-ID recording unit 404, to the player 2 (step S42). Communication of the information from the mobile terminal 4 to the player 2 is performed by the data transmitter-receiver 402 of the mobile terminal 4.

When these pieces of information are transmitted from the mobile terminal 4 to the player 2, the player 2 transmits the player ID of the player 2, the type(s) and name(s) of content data stored in the content-data recording unit 204 (content data information), and function information indicating the function(s) of the player 2 to the mobile terminal 4 (step S43).

The above-described information is transmitted from the player 2 to the mobile terminal 4. The user U2 confirms the information, and then selects desired content data (to be played) and gives an instruction on how to use the content data (playback in this case) (step S44).

The mobile terminal 4 creates a one-time password using the terminal ID of the mobile terminal 4, the player ID transmitted from the player 2, and current time information obtained from the time keeping unit 405 (step S45). Necessary information to create the one-time password essentially includes, according to an aspect of the present invention, the terminal ID and the current time information. In this case, in addition to the terminal ID and the current time information, the player ID is also used. The one-time password is created using the player ID, the above-described terminal ID, and the current time information.

The one-time password may be created using additional information. For example, the one-time password may be created using, in addition to the above-described information, operation information concerning the user-performed operation for using the content data, such as the user-desired content data information and the operation instruction information on how to use the content data (playback in this case), and the user ID.

Necessary information to create the one-time password may include, in addition to the terminal ID of the mobile terminal 4 and the current time information, several additional pieces of information. Needless to say, the types of information to be used must be determined in advance. The one-time password is created by the password creating unit 406.

When the mobile terminal 4 creates the one-time password in this manner, the mobile terminal 4 transmits the one-time password, the operation information concerning the user-performed operation for using the content data, that is, the information specifying the content data desired by the user U2 (content data information) and the operation instruction information specifying the manner of using (playing in this case) the content data, the terminal ID of the mobile terminal 4, and the player ID transmitted from the player 2 to the player 2 (step S46).

Upon reception of these pieces of information from the mobile terminal 4, the player 2 temporarily stores these pieces of information in a memory (that exists in the control command unit 203) and transmits, of these pieces of information, the terminal ID, the player ID, and the operation information on the operation for using the content data (content data information and operation instruction information) to the service center 1 (step S47).

Upon reception of these pieces of information transmitted from the player 2, the service center 1 confirms the terminal ID, the player ID, and the operation information concerning the operation for using the content data (content data information and operation instruction information) (step S48) and uses, of these pieces of information, necessary information to create a one-time password (step S49).

The one-time password is created using the same information and the same algorithm as those used by the mobile terminal 4 to create the one-time password. In this case, since the mobile terminal 4 uses the terminal ID of the mobile terminal 4, the player ID transmitted from the player 2, and the current time information to create the one-time password, the service center 1 also uses the terminal ID, the player ID, and the current time information, which is obtained from the time keeping unit 101 of the service center 1, to create a one-time password.

Since these one-time passwords are created by the mobile terminal 4 and the service center 1 using the same information and the same algorithm, the same one-time password is created by the mobile terminal 4 and the service center 1. This one-time password is created using the current time (including the date and the current time) serving as one element. Since the current time is expressed in seconds, the one-time password is only valid at a limited time. In other words, the one-time password is uniquely present in the time domain including the date.

Taking into consideration a time delay from the creation of the one-time password by the mobile terminal 4 to the creation of the mobile terminal 4 by the service center 1 (a time delay due to necessary time for communication), the current time information may include a more-or-less permissible time deviation.

When the one-time password is also created at the service center 1 side as described above, this one-time password and an operation permission command in response to an operation request by the user U2 in this case are transmitted to the player 2 (step S50).

When the player 2 receives the one-time password and the operation permission command transmitted from the service center 1, the control command unit 203 of the player 2 compares the one-time password transmitted from the mobile terminal 4 (which is temporarily stored in the memory in the control command unit 203) with the one-time password transmitted from the service center 1 and determines whether the two passwords match each other (step S51). When the two passwords match each other, the operation requested by the user U2 is executed (step S52). That is, since the user U2 is trying to perform playback in this case, the control command unit 203 outputs a control signal to perform playback.

As a result, of content data recorded in the content-data recording unit 204 of the player 2, content data selected by the user U2 is read by the data processor 205 and decrypted to be playable, and the decrypted signal is output from the playback-signal output unit 206 to a video unit and/or an audio unit. As described above, the video unit and/or the audio unit may be included in the player 2.

When it is determined that the one-time password created by the mobile terminal 4 matches the one-time password created by the service center 1, the operation requested by the user U2 who owns the mobile terminal 4 is made valid. Therefore, the validity of the password is important. As described above, information exchanged between the service center 1 and the player 2, that is, transmission of information, such as the player ID and the terminal ID from the player 2 to the service center 1 and transmission of the one-time password from the service center 1 to the player 2, must be performed using a high-security communication scheme (communication scheme using a security protocol, such as SSL). In compliance with this communication scheme, communication must be performed between the mobile terminal 4 and the player 2.

According to the first exemplary embodiment, content data recorded in the player 2 (player 2 registered with the service center 1) can be played by performing an operation on the mobile terminal 4 registered with the service center 1. The content data to be played (content data recorded in the content-data recording unit 204 of the player 2) may include that obtained from the service center 1 and that copied from another player. According to an aspect of the present invention, no particular restrictions are imposed on the manner of obtaining content data to be played. The above-described restriction is imposed on the act of using (playing in the above case) content data imported into the player 2 (content data recorded in the content-data recording unit 204).

Accordingly, a main feature of an aspect of the present invention lies in that, using the mobile terminal 4 owned by the user U2, content data stored in the player 2 owned or managed by the other user U1 can be used. In other words, given the player 2 registered with the service center 1 and the mobile terminal 4 registered with the service center 1, the user U2 who owns the mobile terminal 4 can use the player 2 in which content data to be used is stored even when this player 2 is not owned by the user U2. A fee for using the content data is charged to the user U2 using the content data (owner of the mobile terminal 4 on which the operation for using the content data is performed).

For example, when the user U2 uses, of many pieces of content data recorded in the player 2 owned by the user U1, a piece of content data using the mobile terminal 4 owned by the user U2, a fee for using the content data is charged to the user U2. The details of fee rates are determined in advance depending on the use of the content data. For example, fee rates can be specified separately for each type of use, such as playback, of content data. Furthermore, fee rates can be specified separately for each type of content data, such as music or a movie, or, even of the same type, separately for individual pieces of content data.

This information viewing/listening system can be used in various ways. For example, when the above-described player 2 is installed in a room or lobby of a hotel or the like, a guest in the room may freely use content data recorded in the player 2, which is installed in the room or lobby, using the mobile terminal 4 (such as a cellular phone) owned by the guest.

A usage fee is charged to the user in accordance with the use of the content data. The hotel need not settle the fee charged to the user for using the content data. The same applies to an entertainment facility, such as a karaoke shop. Since a fee can be charged for content data used by a customer, when viewed from the facility manager side, management becomes more efficient, and, when viewed from the customer side, the fee structure becomes clearer. The customer becomes less dissatisfied with the usage fee. Needless to say, the player 2 used in this system and the mobile terminal 4 owned by the user using the player 2 are registered in advance with the service center 1 by the above-described processes.

Second Exemplary Embodiment

Although the one-time password is created by the mobile terminal 4 in the first exemplary embodiment described above, the second exemplary embodiment differs greatly from the first exemplary embodiment in that the player 2 has a function of creating a one-time password. The second exemplary embodiment will now be described.

Figure 6:
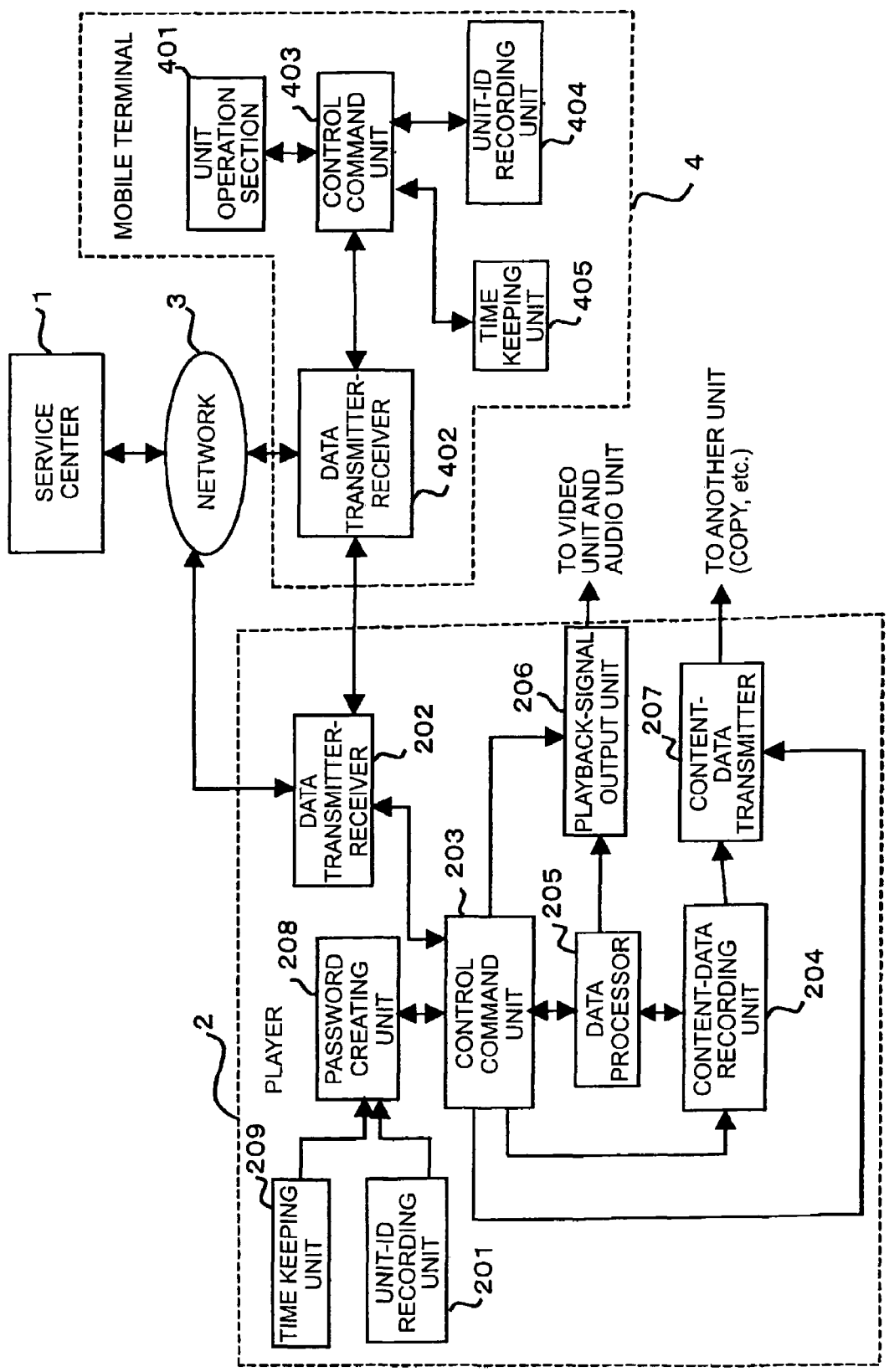
FIG. 6 illustrates a second exemplary embodiment of the present invention, which is a block schematic of an information viewing/listening system in which the player has a password creating function.

FIG. 6 is a schematic showing the configuration of the second exemplary embodiment. FIG. 6 differs from FIG. 1 in that the player 2 is provided with a password creating unit 208 and a time keeping unit 209, which is required to create a password, and that the password creating unit 406 is removed from the mobile terminal 4. Since the remaining portions are the same as those in FIG. 1, the same portions are given the same reference numerals. Needless to say, when the player 2 already has a time keeping unit, the player 2 need not be provided with an additional time keeping unit, and the exiting time keeping unit is used.

Figure 7:
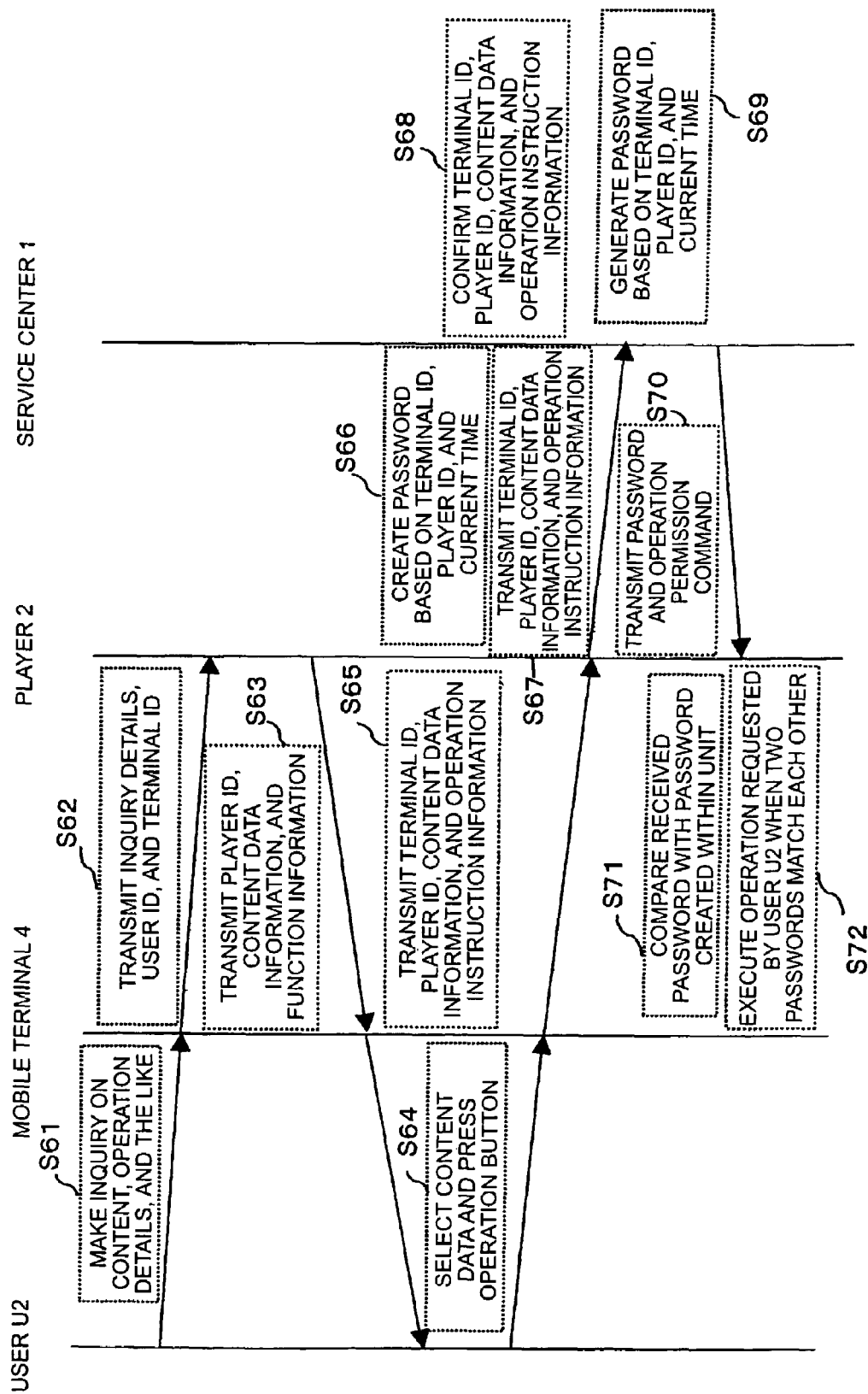
FIG. 7 illustrates the flow of a process performed by the information viewing/listening system according to the second exemplary embodiment shown in FIG. 6, which is a process of playing content data recorded in the player using the mobile terminal.

Since registration processes performed to register the player 2 and the mobile terminal 4 with the service center 1 in the second exemplary embodiment are the same as those in the first exemplary embodiment (see FIGS. 3 and 4), descriptions of the common portions are omitted. Referring to FIG. 7, a process of playing content data recorded in the content-data recording unit 204 of the player 2 using the mobile terminal 4 owned by the user U2 will now be described.

In the second exemplary embodiment, as in the first exemplary embodiment, the player 2 is not owned by the user U2. The player 2 is a player owned by another user, a player installed in a public space, or a player installed in a business facility (such as an accommodation facility or an entertainment facility). The player 2 has at least the same arrangement and functions as those shown in FIG. 6 and is registered with the service center 1 by the in-advance process shown in FIG. 3.

It is assumed that a plurality of pieces of content data is stored in the content-data recording unit 204 of the player 2. The content data may include that obtained from the service center 1 by the above-described process or that stored in another player 2 and copied from the another player 2.

Referring to FIG. 7, steps S61 to S64 are the same as steps S41 to S44 shown in FIG. 5, which are described in the first exemplary embodiment. Therefore, steps S61 to S64 are described briefly. To use the content data, the user U2 performs an operation on the mobile terminal 4 to make an inquiry about the content data stored in the player 2 and the functions of the player 2 (step S61). When such an operation is performed by the user U2 on the mobile terminal 4, the mobile terminal 4 transmits, in addition to the details of the inquiry made by the user U2, the user ID of the user U2 and the terminal ID of the mobile terminal 4, which is read from the unit-ID recording unit 404, to the player 2 (step S62).

When these pieces of information are transmitted from the mobile terminal 4 to the player 2, the player 2 transmits the player ID of the player 2, the type(s) and name(s) of content data stored in the content-data recording unit 204 (content data information), and function information indicating the functions of the player 2 to the mobile terminal 4 (step S63).

The above-described information is transmitted from the player 2 to the mobile terminal 4. The user U2 confirms the information, and then selects desired content data (to be played) and gives an instruction on how to use the content data (playback in this case) (step S64).

Accordingly, the mobile terminal 4 transmits operation information concerning the user-performed operation for using the content data, that is, information specifying the content data desired by the user U2 (content data information) and operation instruction information specifying the manner of using the content data (playback in this case), the terminal ID of the mobile terminal 4, and the player ID transmitted from the player 2 to the player 2 (step S65).

Upon reception of these pieces of information from the mobile terminal 4, the player 2 creates a one-time password using the terminal ID, the player ID, and the current time information (step S66). Necessary information to create the one-time password essentially includes, as described above, in this case, the terminal ID and the current time information. In addition to the terminal ID and the current time information, the player ID may be used. The one-time password may be created using the player ID, the above-described terminal ID, and the current time information.

As described above, the one-time password may be created using additional information. For example, the one-time password may be created using, in addition to these pieces of information, the operation information concerning the user-performed operation for using the content data, that is, the user-desired content data information and the operation instruction information on how to use the content data (playback in this case), and the user ID.

The one-time password is temporarily stored in the memory (in the control command unit 203) of the player 2. The player 2 transmits the terminal ID, the player ID, and the operation information concerning the operation for using the content data (content data information and operation instruction information) to the service center 1 (step S67).

Upon reception of these pieces of information from the player 2, the service center 1 confirms the terminal ID, the player ID, and the operation information concerning the operation for using the content data (content data information and operation instruction information) (step S68) and uses, of these pieces of information, necessary information to create a one-time password (step S69).

Creation of the one-time password is performed using the same information and the same algorithm as those used by the player 2 to create the one-time password. In this case, since the player 2 uses the player ID of the player 2, the current time information, and the terminal ID transmitted form the mobile terminal 4 to create the one-time password, the service center 1 also uses the terminal ID, the player ID, and the current time information, which is obtained from the time keeping unit 101 of the service center 1, to create a one-time password.

When the service center 1 also creates the one-time password, the service center 1 transmits the one-time password and an operation permission command in response to an operation instruction request made by the user to the player 2 (step S70).

Upon reception of the one-time password and the operation permission command transmitted from the service center 1, the control command unit 203 of the player 2 compares the one-time password temporarily stored in the memory in the control command unit 203 with the one-time password transmitted from the service center 1 and determines whether the two passwords match each other (step S71). When the two passwords match each other, the operation desired by the user U2 is executed (step S72). In other words, since the user U2 wants to play the content data in this case, the control command unit 203 outputs a control signal to play the content data.

In the player 2, the data processor 205 reads, of the content data recorded in the content-data recording unit 204, the content data selected by the user U2 and decrypts the content data to be playable. The decrypted signal is output from the playback-signal output unit 206.

As described above, according to the information viewing/listening system of the second exemplary embodiment, as in the first exemplary embodiment, content data recorded in players 2 located at various places can be used using the mobile terminal 4. Since the specific usage has already been described in the first exemplary embodiment, a description thereof is omitted.

Although the user-performed operation is playback in the above-described first and second exemplary embodiments, the user-performed operation is not limited to playback. In response to each of various operations, a one-time password is similarly created by the mobile terminal 4 in the first exemplary embodiment and by the player 2 in the second exemplary embodiment. A one-time password may be created in response to every operation performed by the user U2. Alternatively, the type of operation for which a one-time password must be created may be determined in advance, and a one-time password may be created only when such a predetermined operation is performed.

It is preferable that, every time an operation for which the creation of a one-time time password is unnecessary is performed, the unit ID, the operation information concerning the operation performed by the user U2 (information indicating the type of operation performed), and the content data information (the type of content data selected) be transmitted to the service center 1.

By transmitting such information to the service center 1, the operation performed by the user U2 and preferences of the user U2 can be detected at the service center 1 side. For example, by detecting the operation status of the user U2, when viewed from the service center 1 side, a fee can be charged for every operation performed by the user U2. Accordingly, legitimate and detailed fee settings can be designed. For example, a fee charged for playback can be changed depending on the details of content data. Fee settings associated with various operation types, such as a fee charged for repeated playback, can be designed. By detecting information concerning content data, the preferences of the user U2, such as the type of content data preferred by the user U2, can be detected. Such information concerning content data can be used in advertisement aimed at individual users.

When viewed from the user side, which receives the service, a fee is charged in accordance with the details of the operation. The user is only required to pay the fee for the actual usage. The user thus becomes less dissatisfied with the usage fee.

In the above-described exemplary embodiments, the mobile terminal 4 or the player 2 creates a one-time password using the terminal ID, the player ID, and the current time information. The mobile terminal 4 or the player 2 transmits the terminal ID and the player ID to the service center 1. Using the transmitted information (terminal ID and player ID) and the current time obtained from the time keeping unit O1 1 of the service center 1, the service center 1 creates a one-time password. Alternatively, the current time information used by the mobile terminal 4 or the player 2 to create the one-time password (the current time information used by the mobile terminal 4 to create the one-time password or the current time information used by the player 2 to create the one-time password) may also be transmitted to the service center 1. By transmitting this current time information to the service center 1, the reference time to create the one-time password, which may tolerate some deviations, becomes clearer for the service center 1. Therefore, the service center 1 can create the one-time password with higher accuracy.

When the user U2 performs an operation, such as playback, the time required from the creation of a one-time password by the mobile terminal 4 or the player 2 and the creation of a one-time password by the service center 1 to the determination by the player 2 of whether the two one-time passwords match each other is a very short period of time. When viewed from the user U2 side, the user U2 need not be aware of the above-described processing time, and it seems to the user U2 as if the user U2 were operating the unit in a normal manner. When the one-time password created by the mobile terminal 4 or the player 2 matches the one-time password created by the service center 1, the operation performed by the user U2 is executed. When the two passwords do not match each other, the user-performed operation is not executed.

Although the one-time password and the operation permission command are transmitted from the service center 1 to the player 2 in the above-described example, the operation permission command need not be transmitted. In this case, the control command unit 203 of the player 2 determines whether the one-time password transmitted from the service center 1 matches the one-time password created by the mobile terminal 4 or the player 2. It is preferably that only when the two passwords match each other, the control command unit 203 outputs a signal that makes the user-performed operation valid.

In the above-described exemplary embodiments, the cellular phone is used to serve as the mobile terminal 4 owned by the user U2, and this cellular phone is provided with the functions described in the exemplary embodiments so as to be used as a mobile terminal of an aspect of the present invention. This mobile terminal may include, in addition to such an existing cellular phone, various mobile terminals, such as a PDA (Personal Digital Assistant). In addition to these existing mobile terminals, a mobile terminal for exclusive use in the information viewing/listening system of an aspect of the present invention may be manufactured, and this mobile terminal may be used by each user.

The present invention is not limited to the above-described exemplary embodiments, and various modifications can be made without departing from the scope of the present invention. For example, information that must be transmitted to the service center 1 when the user performs an operation, such as playback, includes the terminal ID, the player ID, and operation information concerning the operation for using the content data (content data information and operation instruction information). However, these pieces of information serve only as examples. Besides essential information including the terminal ID and the like, information that must be transmitted to the service center 1 may be determined appropriately.

A processing program including a process to achieve the present invention may be created, and this processing program may be recorded in a recording medium, such as a floppy disk, an optical disk, or a hard disk. The present invention includes a recording medium having such a processing program recorded thereon. Such a processing program may be obtained via a network.

As described above, according to an aspect of the present invention, content data recorded in a player can be reproduced by performing an operation on a mobile terminal, such as a cellular phone.

Accordingly, using a mobile terminal owned by a user, content data stored in a player owned by another user can be used. Specifically, given a player registered with an information provider (such as a service center) and a mobile terminal registered with the information provider, a user who owns this mobile terminal can use the player in which content data to be used is recorded even when this player is not owned by the user. A fee to use the content data is charged to the user who has used the content data (owner of the mobile terminal on which the operation for using the content data is performed).

The above-described information viewing/listening system can be used in various manners. For example, given that the above-described player is installed in each accommodation facility, each entertaimnent facility, and each public facility, content data recorded in each installed player can be freely used using a mobile terminal (such as a cellular phone) owned by each user.

What is claimed is:

1. An information viewing/listening system, including an information provider that stores content data to be provided to a user, at least one information player that establishes a connection to the information provider via a network and at least plays information, and at least one mobile terminal that operates said at least one information player in response to a predetermined operation performed on the mobile terminal, a process performed when using content data recorded in the information player using the mobile terminal comprises:

in response to the predetermined operation performed by the user on the mobile terminal, creating, by the mobile terminal, a password using preset information and transmitting, by the mobile terminal, at least the password and operation information concerning, of the predetermined operation performed by the user on the mobile terminal, an operation for using the content data to the information player;

upon reception by the information player of the information transmitted from the mobile terminal, transmitting, by the information player, terminal-unique information given to the mobile terminal, player-unique information given to the information player, and the operation information concerning the user-performed operation for using the content data, to the information provider;

upon reception by the information provider of the information transmitted from the information player, creating, by the information provider, a password using preset information and transmitting, by the information provider, at least the password to the information player; and comparing, by the information player, the password transmitted from the information provider with the password transmitted from the mobile terminal and when, as a result of comparison, the passwords are verified, executing, by the information player, the user-performed operation for using the content data.

2. The information viewing/listening system according to claim 1, the passwords being passwords that are valid only for a limited period of time.

3. The information viewing/listening system according to claim 1, necessary information to create each of the passwords essentially including the terminal-unique information given to the mobile terminal and current time information; and, in addition to the terminal-unique information and the current time information, the necessary information including at least one of the player-unique information, the operation information concerning the user-performed operation for using the content data, and user-unique information given to the user.

4. The information viewing/listening system according to claim 1, when the content data recorded in the information player is used using the mobile terminal, the mobile terminal on which the operation for using the content data is performed is charged a fee, when viewed from the information provider side.

5. The information viewing/listening system according to claim 1, the creation of the password by the mobile terminal and, in response thereto, the creation of the password by the information provider being performed when a playback operation to playback the content data recorded in the information player is made, the playback being one of a plurality of operations performed by the user relative to the information player for using the content data.

6. The information viewing/listening system according to claim 1, the creation of the password by the mobile terminal and, in response thereto, the creation of the password by the information provider being performed when any of operation requests of a plurality of predetermined types of operations is made, the operations being among operations performed by the user relative to the information player for using the content data.

7. The information viewing/listening system according to claim 1, when the information player obtains content data from the information provider or another information player, the information player being permitted to obtain the content data without creating the password.

8. The information viewing/listening system according to claim 1, the mobile terminal comprising:
  at least one of a unit operation section to input information and specifying operations;
  a data transmitter-receiver that performs communication between the information player and the information provider;
  a password creating unit that creates the password;
  a time keeping unit that outputs current time information; and
  a unit-unique-information recording unit that records the terminal-unique information given to the mobile terminal.

9. The information viewing/listening system according to claim 1, the information player comprising:
  a content-data recording unit that records content data obtained from the information provider or another information unit;
  a unit-unique-information recording unit that records the player-unique information given to the information player;
  a playback-signal output unit that outputs the content data recorded in the content-data recording unit as a playback signal;
  a control command unit that compares, as a control command process, the password created by the mobile terminal with the password created by the information provider, judges the validity of the passwords, and, when the validity is verified, makes the user-performed operation for using the content data valid; and
  a data transmitter-receiver that exchanges a signal with the information provider via the network and that exchanges a signal with the mobile terminal.

10. The information viewing/listening system according to claim 1, the information provider comprising:
  a data transmitter-receiver that exchanges a signal with the information player and the mobile terminal via the network;
  a content-data recording unit that stores the content data;
  a unit-unique-information recording unit that records unit-unique information concerning each information player registered with the information provider by a predetermined process and each mobile terminal registered with the information provider by a predetermined process;
  a user-information recording unit that records, as user information, information concerning the user who owns each registered mobile terminal;
  a unit-information recording unit that records, as unit information, information concerning each information player, the information including a function of each registered information player;
  a time-information output unit that outputs current time information; and
  a password creating unit that creates the password.

11. An information viewing/listening system including an information provider that stores content data to be provided to a user, at least one information player that establishes a connection to the information provider via a network and at least plays information, and at least one mobile terminal that operates said at least one information player in response to a predetermined operation performed on the mobile terminal, a process performed when using content data recorded in the information player using the mobile terminal comprises the steps of:
  in response to the predetermined operation performed by the user on the mobile terminal, transmitting, by the mobile terminal, at least operation information concerning an operation performed by the user on the mobile terminal for using the content data to the information player;
  upon reception by the information player of the information transmitted from the mobile terminal, creating, by the information player, a password using preset information and transmitting, by the information player, terminal-unique information given to the mobile terminal, player-unique information given to the information player, and the operation information concerning the user-performed operation for using the content data to the information provider;
  upon reception by the information provider of the information transmitted from the information player, creating, by the information provider, a password using preset information and transmitting, by the information provider, at least the password to the information player; and
  comparing, by the information player, the password transmitted from the information provider with the password created by the information player and when, as a result of comparison, the passwords are verified, executing, by the information player, the user-performed operation for using the content data.

12. The information viewing/listening system according to claim 11, the passwords being passwords that are valid only for a limited period of time.

13. The information viewing/listening system according to claim 11, necessary information to create each of the passwords essentially including the terminal-unique information given to the mobile terminal and current time information; and, in addition to the terminal-unique information and the current time information, the necessary information including at least one of the player-unique information, the operation information concerning the user-performed operation for using the content data, and user-unique information given to the user.

14. The information viewing/listening system according to claim 11, when the content data recorded in the information player is used using the mobile terminal, the mobile terminal on which the operation for using the content data is performed is charged a fee, when viewed from the information provider side.

15. The information viewing/listening system according to claim 11, the creation of the password by the information player and, in response thereto, the creation of the password by the information provider being performed when a playback operation for playback of the content data recorded in the information player is made, the playback being one of a plurality operations performed by the user relative to the information player for using the content data.

16. The information viewing/listening system according to claim 11, the creation of the password by the information player and, in response thereto, the creation of the password by the information provider for the information player being performed when any of operation requests of a plurality of predetermined types of operations is made, the operations being among operations performed by the user relative to the information player for using the content data.

17. The information viewing/listening system according to claim 11, when the information player obtains content data from the information provider or another information player, the information player is permitted to obtain the content data without creating the password.

18. The information viewing/listening system according to claim 11, the mobile terminal comprising:
   at least one of a unit operation section to input information and specify operations;
   a data transmitter-receiver that performs communication between the information player and the information provider; and
   a unit-unique-information recording unit that records the terminal-unique information given to the mobile terminal.

19. The information viewing/listening system according to claim 11, the information player comprising:
   a content-data recording unit that records content data obtained from the information provider or another information unit;
   a unit-unique-information recording unit that records the player-unique information given to the information player;
   a playback-signal output unit that outputs the content data recorded in the content-data recording unit as a playback signal;
   a password creating unit that creates the password;
   a control command unit that compares, as a control command process, the password created by the password creating unit with the password created by the information provider, judges the validity of the passwords, and, when the validity is verified, makes the user-performed operation for using the content data valid; and
   a data transmitter-receiver that exchanges a signal with the information provider via the network and that exchanges a signal with the mobile terminal.

20. The information viewing/listening system according to claim 11, the information provider comprises:
   a data transmitter-receiver that exchanges a signal with the information player and the mobile terminal via the network;
   a content-data recording unit that stores the content data;
   a unit-unique-information recording unit that records unit-unique information concerning each information player registered with the information provider by a predetermined process and each mobile terminal registered with the information provider by a predetermined process;
   a user-information recording unit that records, as user information, information concerning the user who owns each registered mobile terminal;
   a unit-information recording unit that records, as unit information, information concerning each information player, the information including a function of each registered information player;
   a time-information output unit that outputs current time information; and a password creating unit that creates the password.

* * * * *